United States Patent [19]
Nicolaisen et al.

[11] Patent Number: 5,133,823
[45] Date of Patent: Jul. 28, 1992

[54] PRIMER FOR CYANOACRYLATE ADHESIVES AND USE THEREOF IN A BONDING METHOD

[75] Inventors: Heinz C. Nicolaisen, Hanover; Annette Rehling, Gehrden, both of Fed. Rep. of Germany

[73] Assignee: Henkel Kommanditgesellschaft auf Aktien, Duesseldorf, Fed. Rep. of Germany

[21] Appl. No.: 642,958

[22] Filed: Jan. 18, 1991

[30] Foreign Application Priority Data

Jun. 1, 1990 [DE] Fed. Rep. of Germany ....... 4017801
Jun. 1, 1990 [DE] Fed. Rep. of Germany ....... 4017802
Nov. 9, 1990 [DE] Fed. Rep. of Germany ....... 4035680

[51] Int. Cl.$^5$ ................................ C09J 5/04
[52] U.S. Cl. .................... 156/314; 106/287.21; 156/331.2; 526/298; 548/335; 548/347
[58] Field of Search ............. 106/287.21; 526/298; 548/335, 347; 156/314, 331.2

[56] References Cited

U.S. PATENT DOCUMENTS 4,933,234  6/1990  Kobe et al. ............... 156/331.8

FOREIGN PATENT DOCUMENTS 245572  2/1990  Japan.

OTHER PUBLICATIONS

Handbook of Chemistry, 1952 edt., p. 327.

*Primary Examiner*—John J. Gallagher
*Attorney, Agent, or Firm*—Ernest G. Szoke; Wayne C. Jaeschke; Norvell E. Wisdom, Jr.

[57] ABSTRACT

The use of certain imidazole derivatives such as 1-benzyl-2-methyl-imidazole, 1-benzyl-imidazole, 1-hydroxyethyl-2-phenyl-4,5-dihydroimidazole, 2-phenyl-4,5-dihydroimidazole and N,N'-carbonyldiimidazole as primer in the bonding of molded parts, especially parts made of polyolefins, with cyanoacrylate adhesives gives bonds with high strengths, even when the application of adhesive is delayed for rather long "open" times after the application of the primer.

20 Claims, No Drawings

PRIMER FOR CYANOACRYLATE ADHESIVES AND USE THEREOF IN A BONDING METHOD

BACKGROUND OF THE INVENTION

1. Field of the Invention

This invention pertains to a primer for synthetic plastic substrate parts to be joined with a cyano-acrylate adhesive and to the use of primer in an adhesive bonding process.

2. Statement of Related Art

It is known that molded articles made of synthetic plastics, especially nonpolar plastics such as polyethylene, polypropylene, polybutylene, polyoxymethylene, polytetrafluoroethylene, polyurethane, polysilicones, and the like can normally be adhesively bonded together only after the surfaces of the molded articles have been subjected to a special pretreatment; see *Ullmann's Encyclopedia of Industrial Chemistry*, Vol. A1, p. 254 (Verlag Chemie, Weinheim, Germany, 1985). Through the known pretreatments, the surface energy of the molded parts is increased, generally specifically by oxidation. Typical pretreatment methods include treatment with oxidizing flames, oxidizing chemicals or electrical discharges.

It is also known that the surfaces of nonpolar plastics to be bonded with cyanoacrylate adhesives may be pretreated with primers containing solutions of certain active ingredients in suitable organic solvents. Thus PCT-WO 88/10289 describes the use of various diazabicyclo or triazabicyclo compounds in solvents such as acetone, methyl ethyl ketone, chlorinated hydrocarbon(s), or methanol as a primer for the above-mentioned purpose. In this process, the primer solutions are applied to the surfaces to be bonded; following evaporation of the solvent, application of the cyanoacrylate adhesives and bonding of the surfaces thus treated takes place. Other primer materials include primary aliphatic amines (described in EP-A 0,295,013), quaternary ammonium compounds (described in EP-A 339,448), derivatives of lutidine, picoline, pyridine and 1-vinylimidazo {described in *Chemical Abstracts* 106:197637z, 197638a (1987)}, and various quinoline and pyridine derivatives (described in JP 62/195071).

However, a substantial drawback of some of the primer substances named is that they accelerate the curing of the cyanoacrylate adhesives without improved bonding to the substrate materials taking place. Frequently—because of spontaneous crosslinking—a distinctly lower adhesion results in comparison to non-pretreated surfaces. A further drawback of the primers known from PCT WO 88/10289 and EP-A 0,295,013 is the fact that the subsequent coating with the cyanoacrylate adhesives must take place as quickly as possible after application of the primer, since otherwise the strength of the bond diminishes. It should also be noted with respect to the vinylimidazole known as a primer that this compound is classified as extremely hazardous to health.

In Japanese Patent Application JP 02-45572 A, a primer for cyanoacrylates is described, the active substance of which is characterized by an imidazole ring. Specifically, the following are mentioned: imidazole, 2-methyl-imidazole, 2-ethyl-4-methyl-imidazole, 1-hydroxyethyl-2-methylimidazole, 2-amino-benzimidazole, 5-nitro-benzimidazole and N{(p-2-benzimidazole)phenyl} maleic acid imide. Higher shear strengths are achieved with these than with dimethylaniline, p-toluidine, or diethylamine primers. Nevertheless, the strengths achieved are not high enough for many applications.

Thus a major object of this invention is improving the handling and use properties of primers for cyanoacrylate adhesives, especially eliminating the above-mentioned drawbacks, thus prolonging the available intermediate storage or "open" time between primer application and application of the adhesive while maintaining the highest possible strength of the bond formed.

DESCRIPTION OF THE INVENTION

In this description, except in the working examples and claims and wherever expressly indicated to the contrary, all numerical specifications of amounts of materials or conditions of reaction or use are to be understood as modified by the term "about" in describing the broadest scope of the invention. Practice of the invention within the exact numerical limits given is generally preferred.

SUMMARY OF THE INVENTION

One embodiment of the invention is the use of primers, on plastic surfaces to be bonded with cyanoacrylate adhesives, of imidazole derivatives of general formula I:

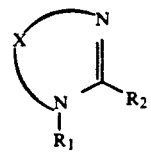

wherein (1) $R_1$ may be hydrogen; an alkyl group that is unsubstituted or substituted with an HO group or with an (alkyl-O)$_3$Si group, wherein the alkyl radical has 1 to 4C atoms; an aryl-alkyl group with 7 to 10C atoms; or an imidazole-CO group, and (2) $R_2$ may be hydrogen or an alkyl, aryl, or aryl-alkyl group with up to 17 carbon atoms, with the condition that one of the substituents $R_1$ or $R_2$ has an aromatic character, and (3) X is one of the groups —CH=CH— or —CR$_3$R$_4$—CR$_5$R$_6$—, wherein $R_3$, $R_4$, $R_5$, and $R_6$ independently of one another represent hydrogen, an alkyl group with 1 to 4C atoms, or an aryl-alkyl group with up to 17C atoms.

For the purposes of this description, a compound or group is to be understood as having "aromatic character" when a sextet of delocalized electrons is present in connection with an isocyclic or heterocyclic ring, such as the rings in benzene or imidazole.

Such imidazole derivatives give very firm bonds with cyanoacrylate adhesives. Surprisingly, their strength at first increases with increasing contact time of the primer, and only decreases after a rather long time; therefore it is no longer necessary to complete the application of the cyanoacrylate adhesives and the bonding as quickly as possible after primer treatment.

DESCRIPTION OF THE PREFERRED EMBODIMENTS

Imidazole derivatives with X=—CR$_3$R$_4$—CR$_5$R$_6$— are preferred, especially 4,5-dihydroimidazole; these compounds are also called imidazolines.

When X is —CR$_3$R$_4$—CR$_5$R$_6$—, $R_1$, $R_2$, $R_3$, $R_4$, $R_5$, and $R_6$ preferably have the following significance: $R_1$ is hydrogen or a hydroxyalkyl group, $R_2$ is an aryl or an aryl-alkyl group with up to 17C atoms, and $R_3$, $R_4$, $R_5$ and $R_6$ independently are each hydrogen or an alkyl group with 1 to 4 carbon atoms. Still more preferably, $R_1$ is hydrogen or a hydroxyethyl group, $R_2$ is a benzyl or phenyl group, and $R_3$, $R_4$, $R_5$ and $R_6$ are hydrogen.

A particularly advantageous imidazoline derivative for use in the invention is 2-phenyl-2-imidazoline.

Typical examples of aryl or aralkyl groups that can be the substituent $R_2$ are phenyl, naphthyl, tolyl, xylyl, benzyl, and naphthylmethyl groups. Typical examples of alkyl groups with 1 to 17 carbon atoms that can likewise form the $R_2$ group are methyl, ethyl, propyl, butyl, pentyl, heptyl, nonyl, undecyl, tridecyl, pentadecyl, and heptadecyl groups; straight chain alkyl groups are preferred. In addition, technical mixtures of these 2-alkylimidazole derivatives can also be used, containing alkyl groups of different chain lengths from the above list. Typical examples of alkyl groups with 1 to 4 carbon atoms and aryl groups that can form the substituents $R_3$, $R_4$, $R_5$ and $R_6$ can be obtained from the above list.

When X is —CH=CH—, $R_1$ and $R_2$ preferably have the following significance: $R_1$ is an aryl group with 7 to 10 carbon atoms or an imidazole-CO group and $R_2$ is hydrogen or an alkyl group with 1 to 4 carbon atoms. Most preferably, $R_1$ is a methyl or benzyl group and $R_2$ is hydrogen or a methyl group.

The imidazole derivatives of general formula I to be used in accordance with the invention are preferably used for the pre-treatment of polyoxymethylene, of polyolefins, e.g., poly- ethylene, polypropylene, and fluorinated polyethylenes, especially polytetrafluoroethylene, and thermoplastic rubber masses and silicone rubber masses.

These plastics can be bonded with conventional cyanoacrylates, e.g., those of the general formula II:

$$H_2C=C(CN)-COOR^3 \qquad (II)$$

in which $R^3$ is an alkyl, alkenyl, cycloalkyl, aryl, alkoxyalkyl, aralkyl or haloalkyl group, preferably a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl or 2-ethoxyethyl group.

The above-mentioned cyanoacrylates are known to those skilled in the adhesives art; see *Ullmann's Encyclopaedia of Industrial Chemistry*, Vol. A1, p. 240 (Verlag Chemie, Weinheim, 1985) as well as U.S. Pat. No. 3,254,111 and U.S. Pat. No. 3,654,340.

According to an additional advantageous embodiment of the invention, the imidazole derivatives are used in solution in polar organic solvents, which evaporate within not more than 24 hours, increasingly more preferably within not more than 4 hours or 60, 15, or 5 minutes, at ambient temperature and pressure from a layer not more than 0.1 millimeter ("mm") in thickness and are chemically inert relative to the imidazole derivatives. Typical examples of such solvents are ketones, esters, alcohols, aliphatic and aromatic hydrocarbons, and halogenated hydrocarbons, including mixtures thereof. Particularly preferred solvents are those from the group of ketones with 3 to 8 carbon atoms, alkanols with 1 to 4 carbon atoms, and esters of acetic acid with alkanols with 1 to 4 carbon atoms, e.g., acetone, methylethyl ketone, methanol, ethanol, propanol, butanol, as well as the ethyl, propyl and butyl esters of acetic acid.

According to another preferred embodiment of the invention, the imidazole derivatives are used in a solution containing from 0.001 to 5.0, or more preferably from 0.05 to 2.0, percent by weight ("w/o"). Such solutions can be applied in finely distributed form to the surface to be treated by dipping, spraying, spreading, or other suitable methods. The contact time on the surface can be influenced by the evaporation rate of the solvent or solvent mixture. Preferred solvents are those which, in addition to an adequate solubilizing capacity for the active ingredient, also provide good stability of the latter in the solution.

In addition, for better application visibility, pigments or optical brighteners may be added to the primer solution. After evaporation of the solvent, the presence of the primer can be detected by color contrast or by suitable opto-electronic measurement methods, e.g., luminescence scanners or ultraviolet lamps.

The invention pertains not only to the use of at least one imidazole derivative of general formula I as a primer for the bonding of parts to be joined but also to a primer itself, that is, a composition consisting essentially of at least one imidazole derivative according to general formula I and a polar organic solvent as described above.

The invention also pertains to a process for bonding parts made of synthetic plastic with cyanoacrylate adhesives, wherein imidazole derivatives of general formula I are used as primers on the surfaces to be bonded.

In the following, the invention will be explained in greater detail on the basis of preferred exemplified embodiments.

Various imidazole compounds to be used in accordance with the invention were dissolved in a solvent selected from the group formed by acetone, ethanol, propanol, and a mixture of ethanol and ethyl acetate with a weight ratio of 1:1. As a rule, homogeneous solutions could be prepared by shaking within 30 minutes ("min"). Test strips of various materials with dimensions of 100×25×3 mm were dipped into the solutions. The plastics used were polyethylene ("PE") (TROVIDUR TM natural PE), polypropylene ("PP") (TROVIDUR TM natural PP), polytetrafluoroethylene ("PTFE") (HOSTAFLON TM TF) and polyoxymethylene ("POM") (DELRIN TM). After removal of the wetted samples, as a rule it was necessary to wait for 5 to 15 minutes until the solvent had evaporated. This was followed by bonding of the pretreated test strips with a commercial cyanoacrylate adhesive based on ethyl cyanoacrylate (SICOMET TM 8300, available commercially from Sichel-Werke GmbH, Hanover, Federal Republic of Germany). After dispensing 2 to 3 drops of the adhesive onto the pretreated material surface, the adhesive was well distributed within a few seconds by applying a second test strip, likewise treated with the primer, while simultaneously moving it around slightly. Following exact alignment to the necessary degree, the joint parts with the freshly prepared adhesive bonds were pressed together with a fixing device for 60 min. In this way, slight surface irregularities could be compensated for, and an advantageous adhesive layer thickness of 0.01 to 0.1 mm could be established. As a rule, the contact time under pressure required in practice amounts to only a few seconds to a few minutes.

The following imidazole derivatives were tested:
A: 1-benzyl-2-methylimidazole
B: N,N'-carbonyldiimidazole
C: 1-benzylimidazole 1: 2-phenyl-2-imidazoline
2: 1-hydroxyethyl-2-phenyl-2-imidazoline
3: 2-benzyl-2-imidazoline
4: 3-(4,5-dihydroimidazole-1-yl)-propyltriethoxysilane
5: 3-(2-imidazoline-1-yl)-propyltriethoxysilane.

After the above-described application of the primer solution and the adhesive as well as bonding at room temperature, and after holding for 24 hr at 20° C., the bonded test pieces were investigated in terms of the tensile shear strength of the bonds at a pull-apart rate of 100 mm/min (in the case of POM: 25 mm/min) using a Wolpert TZM testing machine (50 kN). The values presented in Table 1 represent averages from five individual measurements.

In an additional series of experiments, the effects of storage time after pretreatment and after bonding were investigated. For this purpose, the test strips were wetted with the primer solution as described above, stored for various times, and then bonded as described above. Concentrations of 0.2 w/o and 0.5 w/o imidazoline derivatives in ethanol/ethyl acetate (1:1) were used. The tensile shear strengths were determined after 24 hr storage of the bonded compounds unless otherwise noted. The results obtained are presented in Table 2.

In a further experimental series, the test strips were wetted with the primer solution in acetone, allowed to stand for 10 min for solvent evaporation, bonded as described above, and stored for various times. Then the shear strengths of the bonds were determined as described above. Table 3 presents the results obtained.

In another experiment the effect of the solvent used was investigated. For this purpose, the primer was dissolved in ethanol or 2-propanol; the test strips were wetted with the solution. After 10 min evaporation time, the test strips were bonded as described above, and the tensile shear strengths were determined after the bonded pieces had been stored for 24 hr. Table 4 shows the results obtained.

TABLE 2

| Primer Code | Concentration of Solution, w/o | Evaporation Time, min | Tensile Shear Strength (N/mm$^2$) PE/PE | PP/PP |
|---|---|---|---|---|
| 1 | 0.2 | 5 | 6.8 | 6.4 |
| 1 | 0.2 | 60 | 6.4 | 6.0 |
| 1 | 0.5 | 5 | 7.2 | 6.5 |
| 1 | 0.5 | 60 | 6.4 | 6.4 |
| 1 | 0.5 | 480 | 5.8 | 6.7 |
| 1 | 0.5 | 1440 | 5.3 | 6.0 |
| 1 | 0.5 | 2880 | 5.1 | 6.3 |
| 1 | 0.5 | 4320 | 5.2 | 6.1 |
| A | 0.5 | 5 | 6.5 | 7.2 |
| A | 0.5 | 60 | 5.8 | 7.0 |
| A | 0.5 | 480 | 4.8 | 6.5 |
| A | 0.5 | 1440 | 3.5 | 5.6 |
| A | 0.5 | 2880 | 3.1 | 5.4 |
| A | 0.5 | 4320 | 2.7 | 5.0 |
| C | 0.5 | 5 | 6.0 | 5.9 |
| C | 0.5 | 60 | 5.5 | 6.8 |
| C | 0.5 | 480 | 4.7 | 5.7 |
| C | 0.5 | 1440 | 3.6 | 4.3 |

Note for Table 2
Acronyms, abbreviations, and other symbols have the same meaning as in Table 1.

TABLE 3

| Primer Code | Concentration of Solution, w/o | Storage Time after Bonding, Hours | Tensile Shear Strength, N/mm$^2$ | | |
|---|---|---|---|---|---|
| | | | PE/PE | PP/PP | PTFE/PTFE |
| 1 | 0.5 | 8 | 5.5 | 4.5 | 2.8 |
| 1 | 0.5 | 24 | 7.2 | 6.5 | 4.0 |
| 1 | 0.5 | 168 | 7.5 | 6.7 | 4.0 |
| Comparison | — | 168 | 0.2 | 0.1 | 0.1 |

Note for Table 3
Acronyms, abbreviations, and other symbols have the same meaning as in Table 1.

TABLE 1

| Primer Code | Concentration of Primer in Solution, w/o | Tensile Shear Strength (N/mm$^2$) for: | | | |
|---|---|---|---|---|---|
| | | PE/PE[1] | PP/PP[2] | PTFE/PTFE[3] | POM/POM[4] |
| Primer solutions in acetone | | | | | |
| A | 0.5 | 6.2 | 5.3 | 2.5 | |
| B | 0.2 | 4.1 | 6.2 | 3.0 | |
| B | 0.5 | 3.5 | 4.0 | n.d.[5] | |
| C | 0.2 | 4.8 | 4.5 | n.d. | |
| C | 0.5 | 6.8 | 5.7 | 2.3 | |
| C | 1.0 | 5.1 | 4.5 | 2.0 | |
| 1 | 0.1 | 6.5 | 6.2 | 3.7 | |
| 1 | 0.5 | 7.2 | 6.5 | 4.0 | |
| 1 | 1.0 | 6.7 | 6.0 | 3.6 | |
| Primer solutions in ethanol/ethyl acetate (1:1)* | | | | | |
| 1 | 0.2 | 5.9 | 6.8 | n.d. | 6.5 |
| 1 | 0.5 | 7.2 | 7.4 | n.d. | 7.1 |
| 2 | 0.5 | 3.5 | 2.1 | n.d. | n.d. |
| 3 | 0.1 | 5.8 (4.9) | 6.2 (5.0) | n.d. | 5.8 |
| 3 | 0.2 | 6.0 (5.2) | 7.4 (6.2) | n.d. | 6.4 |
| 3 | 0.5 | 4.9 (4.7) | 5.2 (5.5) | n.d. | n.d. |
| 4 | 0.2 | 2.1 | 3.5 | n.d. | n.d. |
| 4 | 0.35 | 2.3 | 4.6 | n.d. | n.d. |
| 5 | 0.2 | n.d. | 5.8 | n.d. | n.d. |
| Comparison | 0 | 0.2 | 0.1 | 0 | 0.4 |

Notes for Table 1
*Values in parentheses were obtained after only 2 hours instead of the usual 24 hours of storage time between forming the adhesive bond and measuring the tensile strength.
[1] Polyethylene to polyethylene
[2] Polypropylene to polypropylene
[3] Polytetrafluoroethylene to polytetrafluoroethylene
[4] Polyoxymethylene to polyoxymethylene
[5] Not determined

TABLE 4

| Primer Code | Solvent | Concentration of Primer, w/o | Tensile Shear Strength, N/mm² | |
|---|---|---|---|---|
| | | | PE/PE | PP/PP |
| 1 | ethanol | 0.2 | 6.8 | 6.0 |
| 1 | ethanol | 0.5 | 7.3 | 6.7 |
| 1 | 2-propanol | 0.2 | 6.1 | 5.7 |
| 1 | 2-propanol | 0.5 | 6.4 | 6.0 |

Note for Table 4
Acronyms, abbreviations, and other symbols have the same meaning as in Table 1.

To further evaluate the effect in the bonding of thermoplastic elastomers, a commercial thermoplastic rubber (SANTOPRENE TM 101-64, available from Monsanto Company, Gluvin-La Neuve, Belgium) was used. This material has the elastomer properties of a vulcanized rubber and the simple processing properties of a thermoplastic material. The strength of the adhesive bond with test strips of 100×10×3 mm using the above-mentioned commercial cyanoacrylate adhesive without primer pretreatment in the tensile shear experiment was about 0.1 N/mm²; this corresponds to only a slight bonding. The primer solutions were applied with a brush in this experiment. After pretreatment, a solvent evaporation time of 10, 60, or 180 min was allowed. Bonding was then performed. The results are summarized in Table 5.

Thus the adhesive strength to thermoplastic elastomers could be increased several fold through the use of a primer in accordance with the invention.

TABLE 5

| Primer Code | Solvent | Concentration of Primer, w/o | Evaporation Time, min | Tensile Shear Strength, N/mm² |
|---|---|---|---|---|
| A | acetone | 0.5 | 10 | 0.88 |
| C | acetone | 0.5 | 10 | >1* |
| 1 | acetone | 0.2 | 10 | >1* |
| 1 | acetone | 0.5 | 10 | >1* |
| 1 | acetone | 0.5 | 60 | >1* |
| 1 | ethanol | 0.2 | 10 | >1* |
| 1 | ethanol | 0.5 | 60 | >1* |
| 1 | ethanol | 0.5 | 180 | >1* |

Notes for Table 5
Acronyms, abbreviations, and other symbols have the same meaning as in Table 1.
*Material fractured a few cm away from the bonding site.

Comparison Experiments with a Commercial Product and the Most Nearly Similar Prior Art Product One major drawback of previously known primer active ingredient substances is that they display a fairly rapid degradation of activity after application. Following primer pretreatment and solvent evaporation, cyanoacrylate adhesive bonding has had to be performed rather rapidly. This activity degradation within a brief time, in continuous manufacturing processes, can lead to substantial quality losses in the material being bonded when there are long down times and disturbances after primer application.

The following solutions were prepared for comparison:

1.) 0.5 w/o of 1,8-diazabicyclo-{5.4.0}-undec-7-ene in 1,1,2-trichloro-1,2,2-trifluoroethane (F 113); see PCT-WO 88/10289
2.) 0.5 w/o of 1-vinylimidazole in ethanol/ethyl acetate (1:1); see Chem. Ab. 106: 197637z, 197638a (1987).

The solution preparation, pretreatment, and bonding were performed as previously described.

The shear strengths determined as a function of the storage time between primer application and bonding (=evaporation time) are shown in Table 6. See Table 2 for comparison.

TABLE 6

| Comparison Solution | Evaporation Time, min | Tensile Shear Strength N/mm² | |
|---|---|---|---|
| | | PE/PE | PP/PP |
| 1 | 5 | 4.8 | 6.1 |
| 1 | 60 | 3.9 | 5.9 |
| 1 | 480 | 2.1 | 4.2 |
| 1 | 1440 | 1.4 | 2.0 |
| 1 | 2880 | 0.9 | 1.5 |
| 1 | 4320 | 0.8 | 1.2 |
| 2 | 1 | 5.7 | 5.8 |
| 2 | 5 | 1.3 | 6.1 |
| 2 | 60 | 0.8 | 1.3 |
| 2 | 480 | 0.6 | 0.6 |
| 2 | 1440 | 0.4 | 0.4 |

Notes for Table 6.
Acronyms and other symbols have the same meaning as in Table 1.

The comparison experiments show that the preferred primer active ingredient according to PCT-WO 88/10289 breaks down rather extensively even at >1 hour evaporation time before bonding to polyethylene, and in the case of polypropylene, at >8 hours evaporation time.

The 1-vinylimidazole is even more unfavorable in terms of the primer effect. In the case of polyethylene, bonding must be performed almost immediately after evaporation. After only 5 min intermediate storage of the pretreated plastics, the attainable strength after bond curing was very low. The behavior on polypropylene is somewhat more advantageous. After 1 hr intermediate storage, however, the desired effect is likewise no longer present.

The active ingredients in accordance with the invention represent a great improvement compared to the known active ingredients. This is especially true for the active ingredient 2-phenyl-2-imidazoline according to the invention: on polyethylene even after 72 hr (=4,320 min) it shows good strengths of >5 N/mm². On polypropylene, the strengths achieved after inter-mediate storage of the pretreated samples for 72 hr, at >6 N/mm², are practically unchanged compared to the initial values.

In an additional comparison experiment, an active ingredient explicitly mentioned in JP 02-45572 A, namely imidazole, was used. A 0.5 w/o solution in acetone was applied to test strips of PE, PP, and PTFE. The solvent had evaporated after 15 min. See above, before Table 1, for further treatment. The following values were obtained for the tensile shear strength in N/mm²: 2.0 for PE/PE; 2.5 for PP/PP; and 1.5 for PTFE/PTFE.

Comparison with the values in Table 1 shows that the strengths are distinctly lower, specifically only about half as great.

The invention claimed is:

1. A process for bonding two synthetic plastic substrates, comprising the steps of:
   (A) applying to the surface to be bonded of at least one of the substrates at least one imidazole derivative conforming to the general formula I:

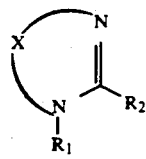

wherein (1) R₁ is selected from the group consisting of hydrogen; alkyl group that is unsubstituted or substituted with an HO group or with an (alkyl-O)₃Si group, wherein the alkyl radical has 1 to about 4C atoms; aryl-alkyl groups with about 7 to about 10C atoms; and imidazole-CO groups, and (2) R₂ is selected from the group consisting of hydrogen, and alkyl, aryl, and aryl-alkyl groups with up to about 17 carbon atoms, with the condition that one of the substituents R₁ or R₂ has an aromatic character, and (3) X is one of the groups —CH=CH— or —CR₃R₄—CR₅R₆—, wherein each of R₃, R₄, R₅, and R₆ independently of one another is selected from the group consisting of hydrogen, alkyl groups with 1 to about 4C atoms, and aryl-alkyl groups with up to about 17C atoms;

(B) subsequently applying to the surface prepared in step (A) a cyanoacrylate adhesive; and (C) bringing the surface prepared in step (B) into contact with the other synthetic plastic surface to be bonded; and (D) maintaining the surfaces contacted in step (C) in contact under sufficient pressure for a sufficient time to permit formation of an adhesive bond between the surfaces.

2. A process according to claim 1, wherein X is —CH=CH—, R₁ is an aryl-alkyl group with 7 to about 10C atoms or an imidazole-CO group, and R₂ is hydrogen or an alkyl group with 1 to about 4C atoms.

3. A process according to claim 2, wherein R₁ is a benzyl group and R₂ is hydrogen or a methyl group.

4. A process according to claim 1, wherein X is —CR₃R₄—CR₅R₆—, R₁ is hydrogen or a hydroxyalkyl group, R₂ is an aryl or an aryl-alkyl group with up to about 17C atoms, and each of R₃, R₄, R₅, and R₆ independently of one another is hydrogen or an alkyl group with 1 to about 4C atoms.

5. A process according to claim 4, wherein R₁ is hydrogen or a hydroxyethyl group, R₂ is a benzyl or phenyl group, and each of R₃, R₄, R₅, and R₆ is hydrogen.

6. A process according to claim 5, wherein in step (A) the imidazole derivative is applied to the surface as a solution containing from about 0.001 to about 5 w/o of the imidazole derivative in an organic solvent that is chemically inert to the imidazole derivative and that will evaporate within about 24 hours at ambient temperature and pressure from a film no more than about 0.1 mm in thickness.

7. A process according to claim 4, wherein in step (A) the imidazole derivative is applied to the surface as a solution containing from about 0.001 to about 5 w/o of the imidazole derivative in an organic solvent that is chemically inert to the imidazole derivative and that will evaporate within about 24 hours at ambient temperature and pressure from a film no more than about 0.1 mm in thickness.

8. A process according to claim 3, wherein in step (A) the imidazole derivative is applied to the surface as a solution containing from about 0.001 to about 5 w/o of the imidazole derivative in an organic solvent that is chemically inert to the imidazole derivative and that will evaporate within about 24 hours at ambient temperature and pressure from a film no more than about 0.1 mm in thickness.

9. A process according to claim 2, wherein in step (A) the imidazole derivative is applied to the surface as a solution containing from about 0.001 to about 5 w/o of the imidazole derivative in an organic solvent that is chemically inert to the imidazole derivative and that will evaporate within about 24 hours at ambient temperature and pressure from a film no more than about 0.1 mm in thickness.

10. A process according to claim 1, wherein in step (A) the imidazole derivative is applied to the surface as a solution containing from about 0.001 to about 5 w/o of the imidazole derivative in an organic solvent that is chemically inert to the imidazole derivative and that will evaporate within about 24 hours at ambient temperature and pressure from a film no more than about 0.1 mm in thickness.

11. A process according to claim 10, wherein the organic solvent is selected from the group consisting of ketones with 3 to about 8 carbon atoms, alkanols with about 1 to about 4 carbon atoms, and esters of acetic acid with alkanols containing about 1 to about 4 carbon atoms and the concentration of the imidazole derivative in the solution is from about 0.05 to about 2 w/o.

12. A process according to claim 9, wherein the organic solvent is selected from the group consisting of ketones with 3 to about 8 carbon atoms, alkanols with about 1 to about 4 carbon atoms, and esters of acetic acid with alkanols containing about 1 to about 4 carbon atoms and the concentration of the imidazole derivative in the solution is from about 0.05 to about 2 w/o.

13. A process according to claim 8, wherein the organic solvent is selected from the group consisting of ketones with 3 to about 8 carbon atoms, alkanols with about 1 to about 4 carbon atoms, and esters of acetic acid with alkanols containing about 1 to about 4 carbon atoms and the concentration of the imidazole derivative in the solution is from about 0.05 to about 2 w/o.

14. A process according to claim 7, wherein the organic solvent is selected from the group consisting of ketones with 3 to about 8 carbon atoms, alkanols with about 1 to about 4 carbon atoms, and esters of acetic acid with alkanols containing about 1 to about 4 carbon atoms and the concentration of the imidazole derivative in the solution is from about 0.05 to about 2 w/o.

15. A process according to claim 6, wherein the organic solvent is selected from the group consisting of ketones with 3 to about 8 carbon atoms, alkanols with about 1 to about 4 carbon atoms, and esters of acetic acid with alkanols containing about 1 to about 4 carbon atoms and the concentration of the imidazole derivative in the solution is from about 0.05 to about 2 w/o.

16. A composition of matter consisting essentially of from about 0.001 to about 5.0 w/o, based on the composition as a whole, of at least one imidazole derivative conforming to the general formula I:

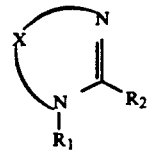

wherein (1) $R_1$ is selected from the group consisting of hydrogen; alkyl group that is unsubstituted or substituted with an HO group or with an (alkyl-O)$_3$Si group, wherein the alkyl radical has 1 to about 4C atoms; aryl-alkyl groups with about 7 to about 10C atoms; and imidazole-CO groups, (2) $R_2$ is selected from the group consisting of hydrogen, and alkyl, aryl, and aryl-alkyl groups with up to about 17 carbon atoms, with the condition that one of the substituents $R_1$ or $R_2$ has an aromatic character, and (3) X is one of the groups —CH=CH— or —CR$_3$R$_4$—CR$_5$R$_6$—, wherein each of $R_3$, $R_4$, $R_5$, and $R_6$ independently of one another is selected from the group consisting of hydrogen, alkyl groups with 1 to about 4 carbon atoms, and aryl-alkyl groups with up to about 17 carbon atoms; and of an organic solvent that is chemically inert to the imidazole derivative and that will evaporate within about 24 hours at ambient temperature and pressure from a film no more than about 0.1 mm in thickness.

17. A composition according to claim 16, wherein X is —CH=CH—, $R_1$ is an aryl-alkyl group with 7 to about 10C atoms or an imidazole-CO group, and $R_2$ is hydrogen or an alkyl group with 1 to about 4C atoms.

18. A composition according to claim 17, wherein $R_1$ is a benzyl group and $R_2$ is hydrogen or a methyl group, the amount of total imidazole derivative conforming to formula I is from about 0.05 to about 2.0 w/o, based on the composition as a whole, and the organic solvent is selected from the group consisting of ketones with 3 to about 8 carbon atoms, alkanols with about 1 to about 4 carbon atoms, and esters of acetic acid with alkanols containing about 1 to about 4 carbon atoms.

19. A composition according to claim 16, wherein X is —CR$_3$R$_4$—CR$_5$R$_6$—, $R_1$ is hydrogen or a hydroxyalkyl group, $R_2$ is an aryl or an aryl-alkyl group with up to about 17C atoms, and each of $R_3$, $R_4$, $R_5$, and $R_6$ independently of one another is hydrogen or an alkyl group with 1 to about 4C atoms.

20. A composition according to claim 19, wherein $R_1$ is hydrogen or a hydroxyethyl group, $R_2$ is a benzyl or phenyl group; each of $R_3$, $R_4$, $R_5$, and $R_6$ is hydrogen; the amount of total imidazole derivative conforming to formula I is from about 0.05 to about 2.0 w/o, based on the composition as a whole; and the organic solvent is selected from the group consisting of ketones with 3 to about 8 carbon atoms, alkanols with about 1 to about 4 carbon atoms, and esters of acetic acid with alkanols containing about 1 to about 4 carbon atoms.

* * * * *